(12) United States Patent
Peng

(10) Patent No.: US 8,326,544 B2
(45) Date of Patent: *Dec. 4, 2012

(54) DIPLET-BASED SEISMIC PROCESSING

(75) Inventor: Chengbin Peng, Sugar Land, TX (US)

(73) Assignee: WesternGeco L.L.C., Houston, TX (US)

( * ) Notice: Subject to any disclaimer, the term of this patent is extended or adjusted under 35 U.S.C. 154(b) by 10 days.

This patent is subject to a terminal disclaimer.

(21) Appl. No.: 12/976,240

(22) Filed: Dec. 22, 2010

(65) Prior Publication Data

US 2011/0153218 A1    Jun. 23, 2011

Related U.S. Application Data

(63) Continuation of application No. 11/749,795, filed on May 17, 2007, now Pat. No. 7,937,224.

(60) Provisional application No. 60/801,133, filed on May 17, 2006.

(51) Int. Cl.
G01V 1/28    (2006.01)
G01V 1/00    (2006.01)

(52) U.S. Cl. ............................................. 702/17; 367/73

(58) Field of Classification Search .................... 702/17, 702/1–2, 11, 14, 16, 18, 189; 703/5, 10; 367/14, 36–38, 43, 45, 47–49, 53, 73
See application file for complete search history.

(56) References Cited

U.S. PATENT DOCUMENTS

| | | |
|---|---|---|
| 4,797,860 A | 1/1989 | Quaglino |
| 5,206,837 A | 4/1993 | Beasley et al. |
| 5,274,605 A | 12/1993 | Hill |
| 5,530,679 A | 6/1996 | Albertin |
| 5,640,368 A | 6/1997 | Krebs |
| 5,671,136 A | 9/1997 | Willhoit, Jr. |
| 5,946,271 A | 8/1999 | Dragoset, Jr. |
| 6,028,819 A | 2/2000 | Mullarkey et al. |
| 6,049,759 A | 4/2000 | Etgen |
| 6,055,482 A | 4/2000 | Sudhakar et al. |
| 6,253,157 B1 | 6/2001 | Krebs |
| 6,343,256 B1 | 1/2002 | Winbow et al. |
| 6,493,634 B1 | 12/2002 | Krebs et al. |
| 6,697,737 B2 | 2/2004 | Jones et al. |
| 6,735,527 B1 | 5/2004 | Levin |
| 6,757,217 B2 | 6/2004 | Eastwood et al. |
| 6,763,305 B2 | 7/2004 | Bernitsas |

(Continued)

FOREIGN PATENT DOCUMENTS

WO    2005008292 A1    1/2005

OTHER PUBLICATIONS

Brandsberg-Dahl et al., Focusing in Dip and AVA Compensation on Scattering-Angle/Azimuth Common Image Gathers, Jan.-Feb. 2003, Geophysics, vol. 68, No. 1, pp. 232-254.*

(Continued)

Primary Examiner — Toan M Le

(57) ABSTRACT

Methods, systems and software for generating a multi-dimensional volume are disclosed. The methods include decomposing one or more original volumes into a collection of diplets, wherein each diplet includes information about spatial location, orientation, amplitude, wavelet, acquisition configuration, and coherency. The methods further include migrating the collection of diplets using one or more of a velocity model or an anisotropic velocity model, and synthesizing one or more of the migrated diplets to an output multi-dimensional seismic volume.

21 Claims, 9 Drawing Sheets

U.S. PATENT DOCUMENTS

| | | | |
|---|---|---|---|
| 6,785,612 | B1 | 8/2004 | Zhang |
| 7,072,767 | B2 | 7/2006 | Routh et al. |
| 7,480,206 | B2 | 1/2009 | Hill |
| 7,937,224 | B2 * | 5/2011 | Peng .............................. 702/17 |
| 7,970,546 | B1 | 6/2011 | Peng |
| 8,010,293 | B1 | 8/2011 | Peng et al. |
| 2005/0129324 | A1 | 6/2005 | Lemke |
| 2005/0135189 | A1 | 6/2005 | Wang |
| 2005/0197779 | A1 | 9/2005 | Stinson et al. |
| 2005/0207278 | A1 | 9/2005 | Reshef et al. |
| 2006/0018191 | A1 | 1/2006 | Kappius et al. |
| 2006/0133206 | A1 | 6/2006 | Barnes |
| 2006/0227662 | A1 | 10/2006 | Foy |
| 2007/0271041 | A1 | 11/2007 | Peng |
| 2009/0037114 | A1 | 2/2009 | Peng et al. |
| 2009/0043549 | A1 | 2/2009 | Peng |

OTHER PUBLICATIONS

Albertin, et al., True-Amplitude Beam Migration, SEG International Exposition and 74th Annual Meeting, Oct. 2004.

Gray, Gaussian Beam Migration of Common-Shot Records, SEG International Exposition and 74th Annual Meeting, Oct. 2004.

Nowack, Common-Offset Gaussian Beam Inversion: Final Report, Earth and Atmospheric Sciences, Purdue University, Jul. 2004.

Raz, Beam Stacking: A Generalized Preprocessing Technique, Geophysics, Sep. 1987, pp. 1199-1210, vol. 52, No. 9.

Chavez-Perez, et al., Crustal Imaging in Southern California using Earthquake Sequences, 7th International Symposium on Deep Seismic Profiling of the Continents, Sep. 1996.

Hennenfent, et al., Seismic Denoising with Nonuniformly Sampled Curvelets, Noise and Signal Interaction, IEEE, 2006.

Nowack, et al., The Two-Dimensional Gaussian Beam Synthetic Method: Testing and Application, Journal of Geophysical Research, Sep. 10 1984, pp. 7797-7819, vol. 89, No. B9.

Wu, et al., Wave Propagation and Imaging Using Gabor-Daubechies Beamlets, Modeling and Imaging Laboratory, IGPP, University of California, Oct. 2001.

3D Beam Prestack Depth Migration with Examples from Around the World, Tech Link, A Publication of Petroleum Geo-Services, Aug. 2008, pp. 1-6, vol. 8, No. 8.

Chen, et al., Target-Oriented Beamlet Migration Based on Gabor-Daubechies Frame Decomposition, Geophysics, Mar.-Apr. 2006, pp. S37-S52, vol. 71, No. 2.

Jin, et al., Seismic Depth Migration with Pseudo-Screen Propagator, Computational Geoscience, 1999, pp. 321-335, vol. 3.

Alkhalifah, "Gaussian beam depth migration for anisotropic media," Geophysics, Sep.-Oct. 1995, vol. 60(5): pp. 1474-1484.

Gray et al., "Depth model building by interactive manual tomography," SEG Expanded Abstracts, 2000: pp. 1-4.

Hua et al., "Parsimonious 2D prestack Kirchhoff depth migration," Geophysics, May-Jun. 2003, vol. 68(3): pp. 1043-1051.

Sun et al., "3-D prestack Kirchhoff beam migration for depth imaging," Geophysics, Sep.-Oct. 2000, vol. 65(5): pp. 1592-1603.

* cited by examiner

SYNTHETIC EXAMPLE (W/ MATCHING FILTER):
ORIGINAL (0-15), SYNTHETIC (16-31) AND DIFFERENCE (32-47)

DIPLET-BASED SEISMIC PROCESSING

CROSS-REFERENCE TO RELATED APPLICATION

This application is a continuation of U.S. patent application Ser. No. 11/749,795, entitled "Diplet-Based Seismic Processing," which was filed on May 17, 2007, now U.S. Pat. No. 7,937,224, and claims priority to commonly owned U.S. provisional patent application Ser. No. 60/801,133, filed May 17, 2006, entitled "3D Diplet Demigration And Remigration," by Chengbin Peng. Each of these applications is hereby incorporated by reference in its entirety.

BACKGROUND

As subterranean fluid exploration becomes increasingly complex, the importance of analyzing seismic samples increases. In areas of complex geology, seismic depth-migration projects may involve many iterations of model refinement before arriving at a final model. This refinement process is time-consuming and costly, because each iteration may require a complete remigration of the whole prestack seismic data volume, followed by interpretation of the changes in the image, and updating of the model to account for the changes.

BRIEF DESCRIPTION OF THE DRAWING

The patent or application file contains at least one drawing executed in color. Copies of this patent or patent application publication with color drawing(s) will be provided by the Office upon request and payment of the necessary fee.

DETAILED DESCRIPTION

Figure 1:
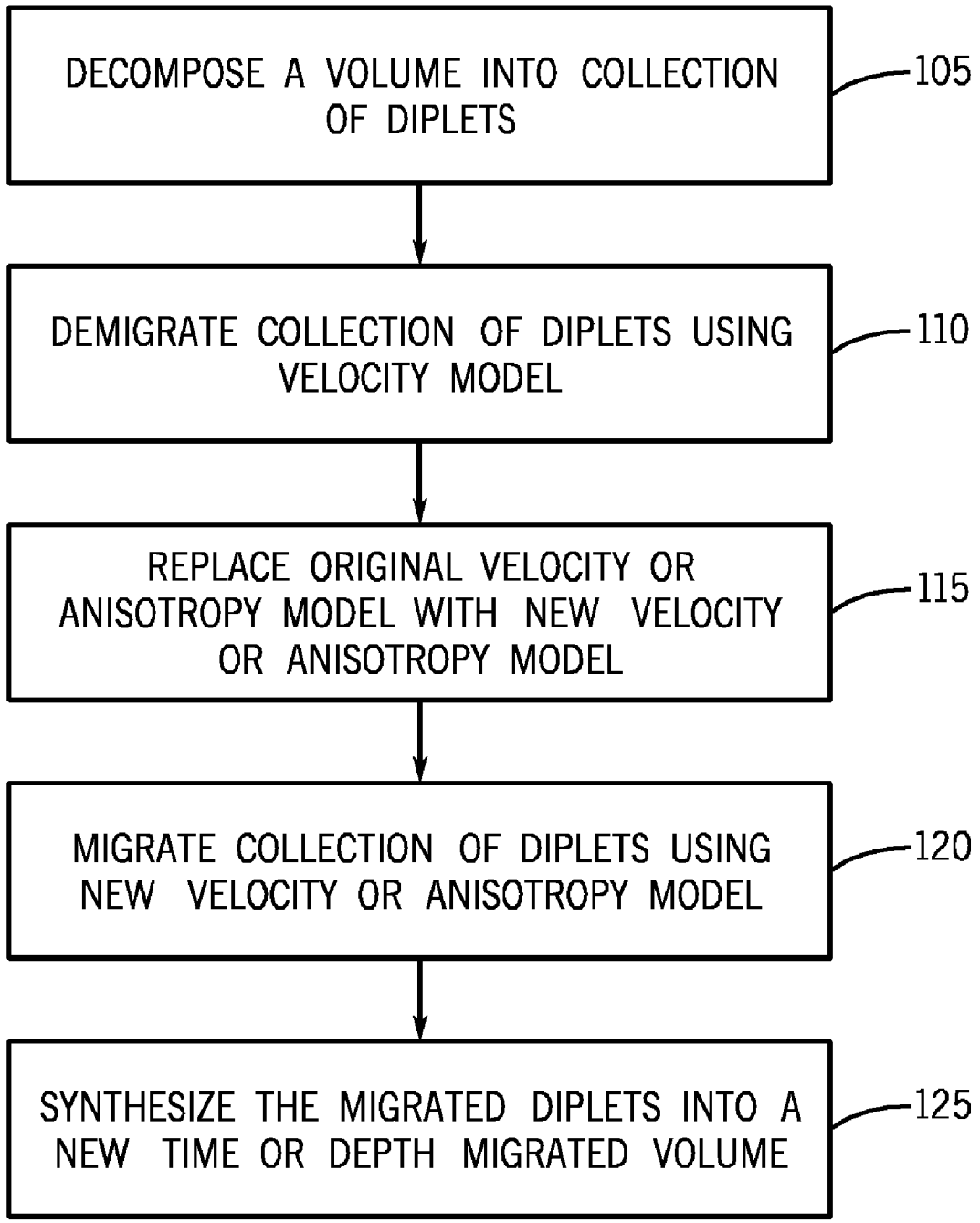
FIG. 1 is a flow chart illustrating an example method of the present disclosure.

FIG. 1 is a flow chart of an example method of the present disclosure. The method includes decomposing a volume into a collection of diplets (block 105). In certain example implementations, the volume is a migrated volume, while in other implementations the volume is an urimigrated volume. In block 110, assuming that the volume decomposed in block 105 is a migrated volume, the method demigrates the collection of diplets using an original velocity model or anisotropic velocity model. In the case of an unmigrated volume, block 11 may be omitted. If the original volume is a migrated volume, the method includes replacing the original velocity model or anisotropic velocity model with a new velocity model or anisotropic velocity model in block 115. The method further includes migration the collection of diplets using one or more of the new velocity model or anisotropic velocity model. In block 125, the method includes synthesizing the migrated diplets (from block 120) into a new time or depth migrated volume. Each of the steps shown in FIG. 1 are explained in greater detail below.

A three-dimensional seismic volume (migrated or unmigrated) may be viewed as a superposition of individual dip components. This superposition of dip components is referred to herein as a "diplet." When a volume is decomposed into a finite—but sufficient—number of diplets, the diplets can be combined to synthesize the original volume. After decomposition, an adaptive match filter can be applied to all or a subset of diplets, such that the volume output from synthesis will be as close as possible to the volume input to decomposition. An adaptive match filter can adjust both the amplitude and the wavelet phase of each diplet. Diplets include beam components plus additional direct and derived attributes. Examples of direct attributes include amplitude, coherency, and wavelet (ID). Examples of derived attributes include reflection angle, reflection azimuth, wavelet stretch, beam spread, and flag. The derived attributes are determined in demigration and migration.

In certain example implementations, each diplet is represented by information stored in a "vertex file" and a "wavelet bank". In certain example implementations, the vertex-file format is an industry standard. In general, the vertex file specifies one or more of the followings attributes for each diplet:

spatial location (e.g., x, y, and z of beam center);
spatial orientation (e.g., the inline and crossline dips: x-dip and y-dip);
source-receiver offset;
source-receiver azimuth;
reflection angle;
reflection azimuth;
wavelet ID;
amplitude;
coherency;
flag;
wavelet stretch; and
beam spread.

The extent of a diplet is its spatial footprint and is stored in the global header of the vertex file. In the process of synthesis, a diplet is sprayed out from its center location up to its extent, using a specially shaped taper. In the process of decomposition, the extent is the size of a local computation window. The extent of a diplet is wavelength-dependent. In certain example implementations, the extent of the diplet is approximately half of its wavelength.

For unmigrated (or demigrated) seismic data, z will actually be the two-way time t; the inline and crossline dips (dz/dx and dz/dy) will actually be dt/dx and dt/dy.

The offset attribute of a diplet is used to store the value in the 4th dimension (i.e., offset) of a seismic data set on which the diplets are computed. For a stack volume, this attribute should be set to zero.

The azimuth attribute of a diplet is used to store the value of seismic acquisition azimuth, which is needed for properly demigrating and (re)migrating a 3D diplet.

The wavelet ID points to a wavelet stored in the wavelet bank. The wavelet is either a time series or a depth series. The wavelet associated with the diplet may be normalized. In certain example implementations, the wavelet of a diplet is used to reconstruct a seismic volume from a collection of diplets. In certain example implementations, the wavelet of the diplet is used to perform wavelet processing for the diplet. One example of wavelet processing for a diplet is to apply migration stretch, which is dependent on both dips and reflection angle. Another example of wavelet processing is to apply band-pass filtering to the wavelet component of a diplet, while other attributes remain unchanged.

In some example implementations, the coherency and amplitude attributes of a diplet are used to eliminate a diplet if it falls below amplitude or coherence thresholds. In certain example implementations, when amplitude gain is applied to a diplet, only the amplitude attribute is scaled; other attributes and the wavelet are unchanged.

The value of the flag attribute controls whether a diplet is used or ignored in computations.

In certain example implementations, the number of diplets at a given spatial location is determined by the amplitude and coherency thresholds used in the decomposition, and may be bound by a specified maximum number of diplets per location. For example, the maximum number of diplets per location may, by default, be five. An adaptive subtraction scheme is used to scan for multiple diplets and optimize the wavelets for all diplets in a given window.

As discussed above, in certain implementations, the method includes decomposing three dimensional seismic data. A seismic volume $D(x, y, z)$ can be expressed as a series of local linear events:

$$D(x, y, z) = \sum_j S_j(z) * \delta(z - xp_{xj} - yp_{yj}) \quad \text{(Eq. 1)}$$

where $S_j$ denotes the wavelet and $(p_{xj}, p_{yj}, -1)$ represents the normal vector for the j-th local event. For migrated data, z represents depth; for unmigrated data, it represents time.

The Fourier Transform of $D(x, y, z)$ in the z direction can be expressed as:

$$\hat{D}(x, y, k_z) = \sum_j \hat{S}_j(k_z) e^{-ik_z(xp_{xj}+yp_{yj})}, \quad \text{(Eq. 2)}$$

where $\hat{S}_j(k_z)$ is the Fourier Transform of the wavelet $S_j(z)$. $k_z$ is the vertical wave number where z is depth or it is frequency where z is time.

If a phase shift $e^{ik_z x p_x}$ is applied and a smoothing window $W(x)$ is convolved along the x direction:

$$(\hat{D}(x, y, k_z) e^{ik_z x p_x}) * W(x) = \quad \text{(Eq. 3)}$$

$$\sum_j (\hat{S}_j(k_z) e^{-ik_z y p_{yj}}) (e^{-ik_z x(p_{xj}-p_x)} * W(x)),$$

where $p_x$ denotes some trial value. The convolution in the second parenthesis on the RHS (right hand side) is equivalent to filtering out data components whose x-dip (actually, $dz/dx$) deviates from $p_x$, that is, $$(\hat{D}(x, y, k_z) e^{ik_z x p_x}) * W(x) \approx \sum_{p_{xj}=p_x} \hat{S}_j(k_z) e^{-ik_z y p_{yj}}. \quad \text{(Eq. 4)}$$

Thus, when an inverse phase shift $e^{-ik_z x p_x}$ is applied:

$$((\hat{D}(x, y, k_z) e^{ik_z x p_x}) * W(x)) e^{-ik_z x p_x} \approx \sum_{p_{xj}=p_x} \hat{S}_j(k_z) e^{-ik_z(xp_x+yp_{yj})}, \quad \text{(Eq. 5)}$$

where the RHS gives the events with x-dip equal to $p_x$ at the same location in the original data. This is an approximation, since in actual practice the other dip components may not be completely eliminated.

After picking x-dips in the filtered data (using equations 2-5) for a series of x-dips, y-dips can be obtained by one-dimensional scanning. The local wavelet can then be extracted for a given x- and y-dip pair.

The method described above converts a two-dimensional scanning problem into two one-dimensional problems, and thus is much faster than published conventional methods. The method also works for situations with multiple dips. For example, FIG. 2 (left) shows the calculated normal vectors of the diplets for a simple volume with three events, and FIG. 2 (right) shows that for a volume with six events with conflicting dips.

3D Seismic Data Synthesis

With calculated diplets, the synthetic volume $D^{sym}(x, y, z)$ can be obtained by summing over the diplets within a certain distance, $$D^{sym}(x, y, z) = \quad \text{(Eq. 6)}$$

$$\sum_{x'} \sum_{y'} W(x'-x, y'-y) S_{x',y'}(z+(x'-x)p_{x'}+(y'-y)p_{y'}),$$

in which $W(x, y)$ represents a normalized Gaussian window, $(p_{x'}, p_{y'}, -1)$ is the calculated normal vector of the diplet at (x', y', z+(x'-x)p_{x'}+(y'-y)p_{y'}), and $S_{x',y'}$ is the wavelet for the diplet.

Figure 2:
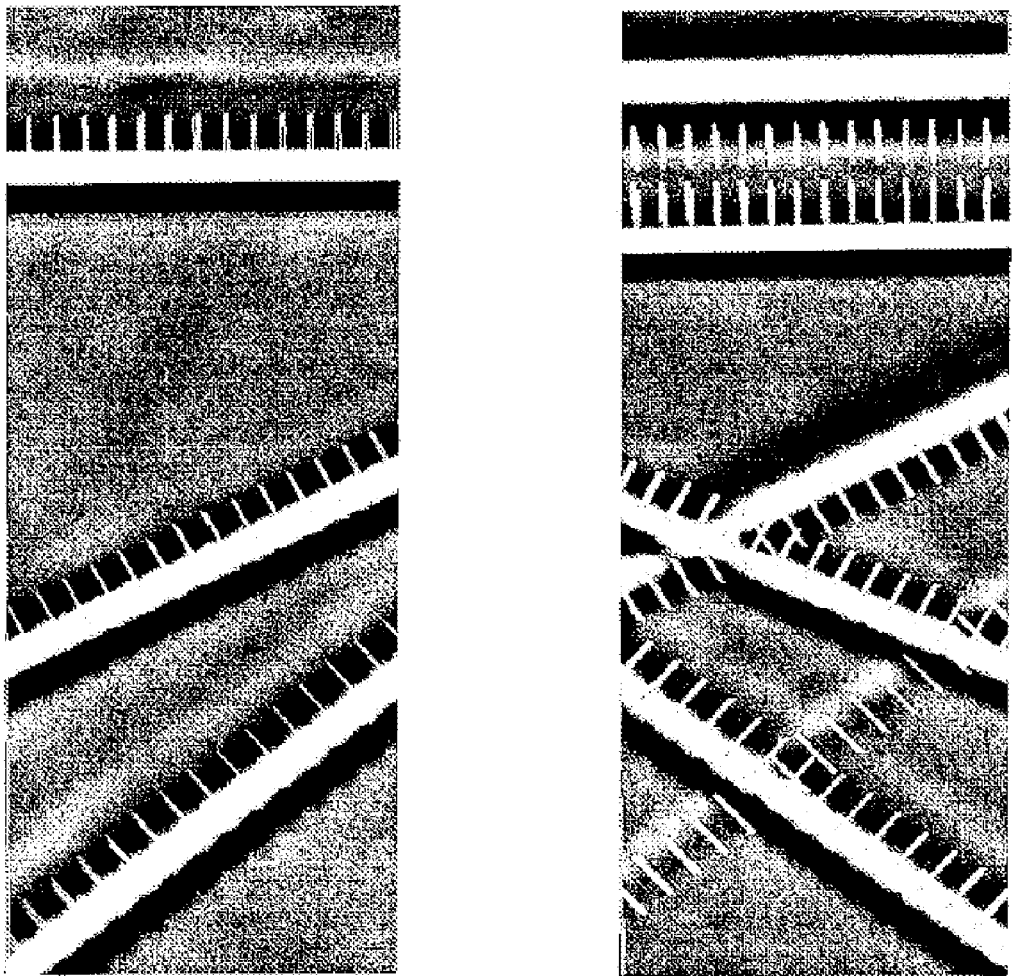
FIG. 2 is a set of two plots showing synthetic seismic events with the normal vectors of decomposed diplets
Figure 3:
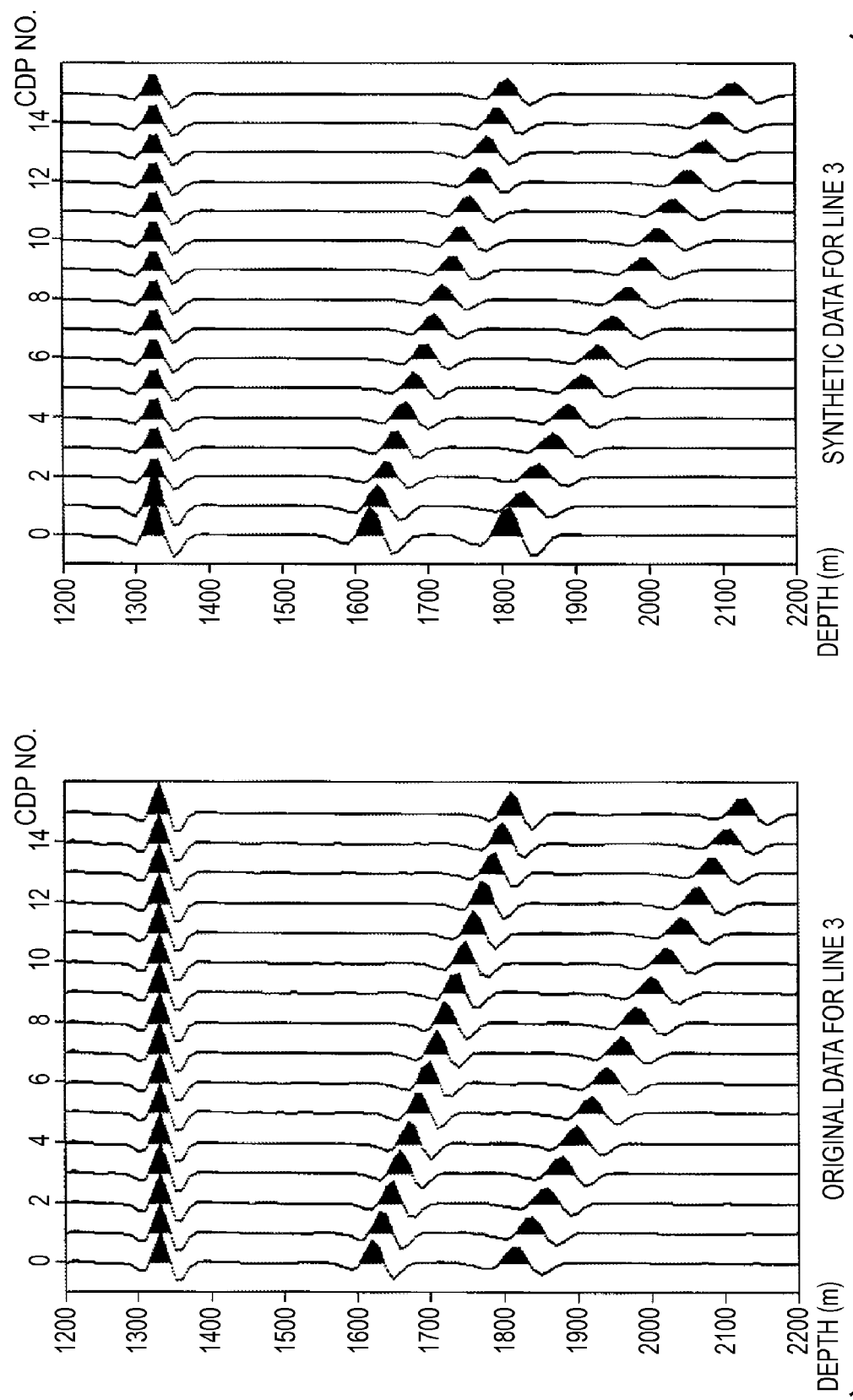
FIGS. 3-5 are wiggle traces comparing input seismic data and synthesized seismic data from diplets.
Figure 4:
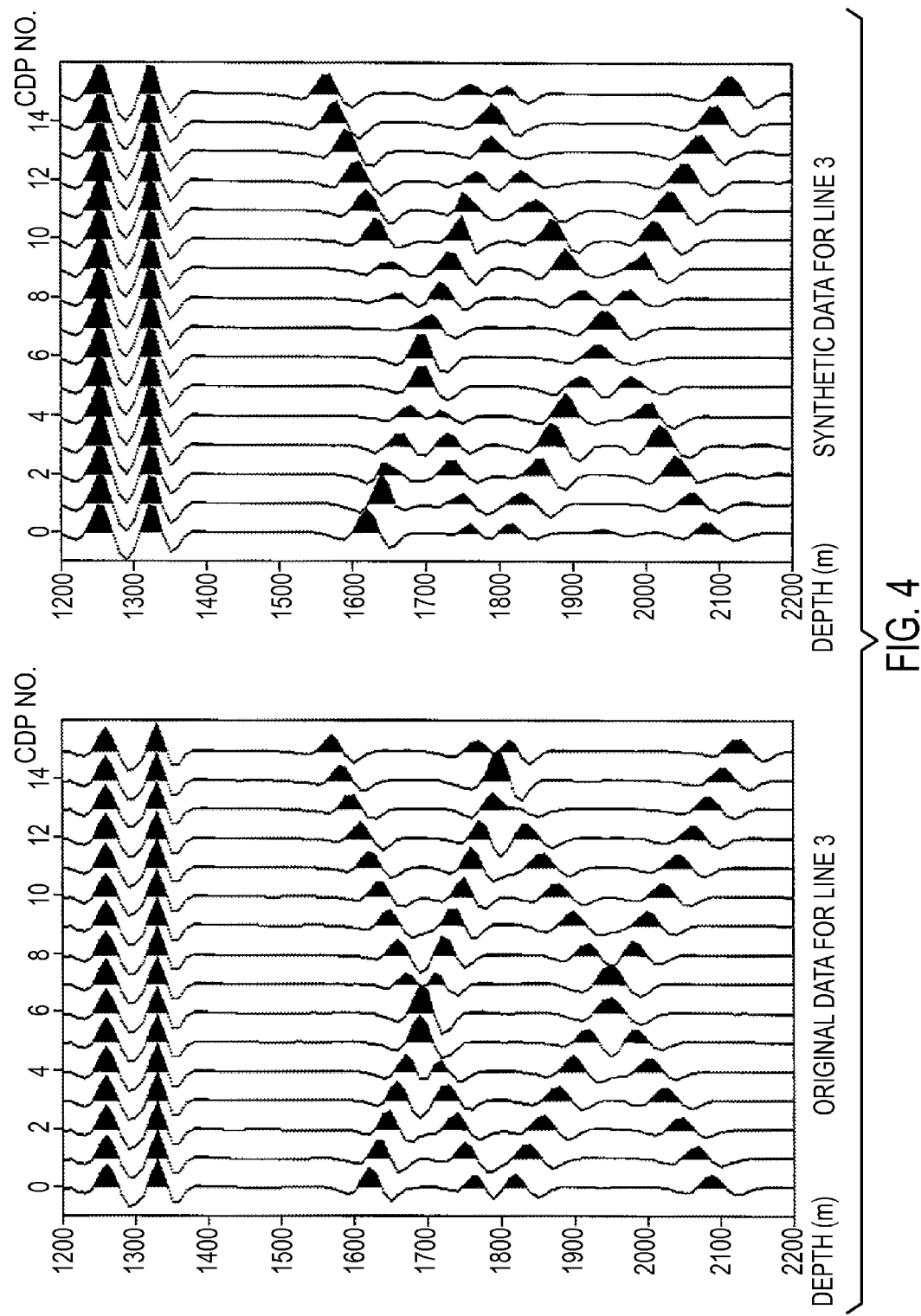

FIG. 3 shows the original data and synthesized data for the non-conflicting-dip case as shown in FIG. 2 (left). FIG. 4 shows the original data and synthesized data for the conflicting-dip case as shown in FIG. 2 (right).

Matching Filter

To mitigate the misfit between the original and synthesized data, an algorithm is used to apply a matching filter $f_j$ to the j-th diplet (j=1, 2, . . . n, where n is the total number of diplets) to adaptively adjust its amplitude and phase by minimizing the following misfit function:

$$E(f) = \iiint_x \iint_y \int_z dx\,dy\,dz \quad \text{(Eq. 7)}$$

$$\left(\Delta D(x, y, z) - \sum_j \sum_{k=-L_f}^{L_f} S_j(z-z_{0j}-k\Delta z) f_{j,k} I_j(x, y)\right)^2 +$$

$$\varepsilon \sum_{j,k} f_{j,k}^2$$

$\Delta D(x, y, z) = D^o(x, y, z) - D^s(x, y, z)$ denotes the residuals between the original $D^o(x, y, z)$ and the synthesized data, $L_f$ denotes the half-length of the matching filter, and the last term on the RHS is a damping term with a weight of $\varepsilon$.

The matching filters can be obtained by solving the equation system for its normal equation $$\frac{\partial E}{\partial f_{jk}} = 0$$

which leads to:

$$\iiint_{x}\iint_{y}\int_{z} dx\,dy\,dz\left(\Delta D(x,y,z) - \sum_{i}\sum_{l=-L_f}^{L_f} S_i(z-z_{0i}-l\Delta z)f_{il}I_i(x,y)\right)$$

$$(S_j(z-z_{0j}-k\Delta z)I_j(x,y)) + \varepsilon f_{j,k} = 0, \qquad \text{(Eq. 8)}$$

for $j=1, \ldots, n$ and $k=-L_f, \ldots, L_f$.

Figure 5:
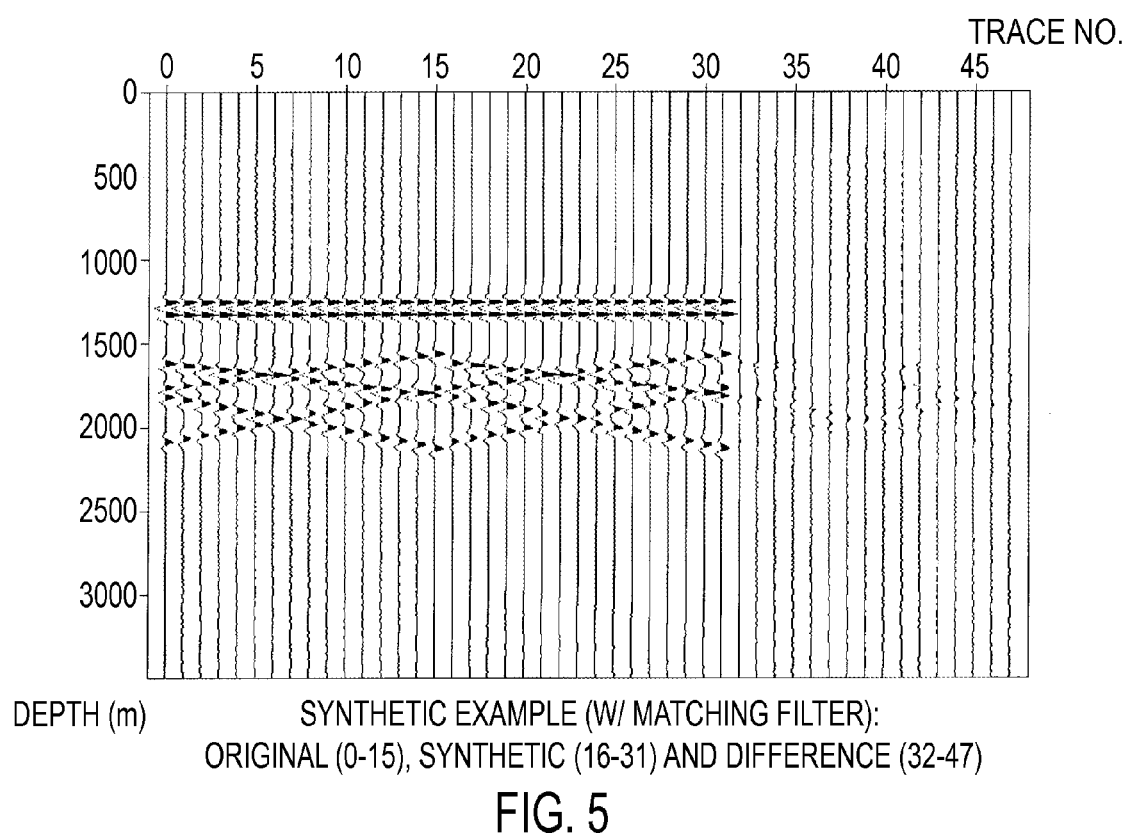

Thus, we have $n*(2*L_f+1)$ equations for the same number of unknowns. This system of equations can be solved using conjugate gradient methods with sparse system representation. FIG. 5 shows the results after applying the match filter to the original data of FIG. 4. In particular, FIG. 5 shows the original data in traces 0-15, the data synthesized using the match filter in traces 16-31, and the difference between the proceeding two sets of data in traces 32-47.

This adaptive subtraction process may optimize the amplitude and phase of each wavelet, such that that it may be possible to minimize the number of diplets needed to accurately represent a given seismic volume.

3D Migration of Seismic Data Using Diplets

This section describes an example method of seismic imaging with diplets. After migration, each input diplet produces an image atom (either prestack or poststack) and the superposition of all image atoms forms a complete seismic image volume.

Depth migration, which may include remigration, of a diplet that is defined in (x, y, t) space repositions the diplet to a location in (x, y, z) space. As part of the migration process, time-domain dips are converted to depth-domain dips. Also, as part of the migration or remigration process, a wavelet undergoes the stretch that is normally associated with depth migration. Conversely, demigration of a depth-domain diplet repositions the diplet to a location in (x, y, t) space. A demigration of such a diplet includes the conversion of the depth-domain dips to time-domain dips, and destretch of the wavelet associated with the diplet.

Diplet migration and diplet demigration expand the conventional four-dimensional prestack imaging space (e.g., x, y, t or z, and offset) into a seven-dimensional diplet imaging space. The seven dimensions include: x, y, z, dip in x direction (i.e., x-dip), dip in y direction (i.e., y-dip), reflection angle, and subsurface reflection azimuth. These additional dimensions provide additional opportunities for one or more of signal separation, noise attenuation, and selective subsetting and stacking based on these attributes.

Because each diplet carries both surface acquisition information and subsurface reflection information, one can easily generate angle gathers from offset gathers, and vice versa. In contrast, it is relatively difficult and costly to produce true reflection-angle gathers with conventional techniques (e.g., wave-equation migration).

Poststack Diplet Imaging Algorithm

Figure 6:
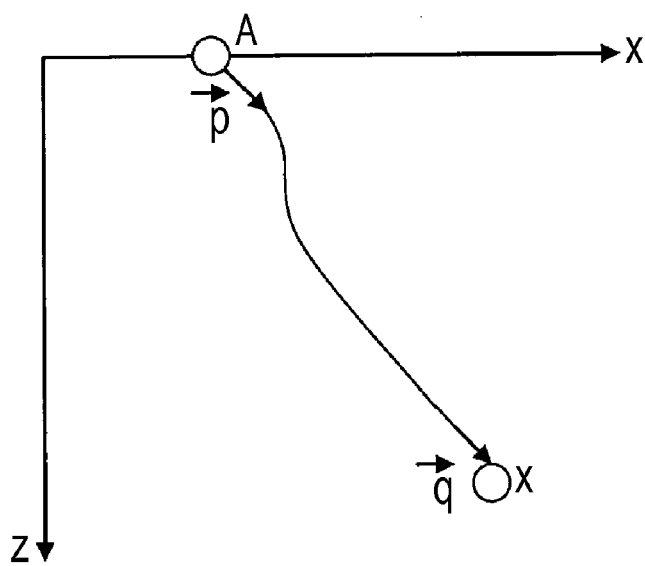
FIGS. 6-7 are illustrations of the travel of a packet of energy.

FIG. 6 shows a packet of seismic energy leaving surface location A in the direction of vector p travels in the earth and finally reaches the point X in the direction of vector q. Suppose we know everything from a point A on the surface to another point X in the subsurface:

$$G(\vec{x}_A, \vec{x}; \vec{p}, \vec{q}), \qquad \text{(Eq. 9)}$$

where G is the atomic Green's function that describes the amplitude and phase of a small packet of seismic energy traveling from the point A to point X. The $\vec{p}$ vector is the direction of energy leaving point A and the $\vec{q}$ vector is the direction of energy arriving at point X.

The Rayleigh integral $$\phi(\vec{x}) = \oiint \phi(\vec{x}_A)G(\vec{x}_A, \vec{x})d\vec{x}_A, \qquad \text{(Eq. 10)}$$

where $\phi$ is the seismic wave field, allows one to compute the value of the wave field at any subsurface point from known values at all surface locations $\vec{x}_A$.

We will make use of the paraxial approximation of the Green's function:

$$G(\vec{x}_A, \vec{x}; \vec{p}, \vec{q}) = G(\vec{x}_A^0, \vec{x}, \vec{p}, \vec{q})e^{i\vec{p}\cdot(\vec{x}_A-\vec{x}_A^0)}, \qquad \text{(Eq. 11)}$$

where $\vec{x}_A^0$ is a lattice of surface grids for decomposition of the seismic wave field.

Then, from equations (10) and (11), $$\phi(\vec{x}) = \sum_L \oiint_{\Delta s_A} \phi(\vec{x}_A)G(\vec{x}_A^0, \vec{x}; \vec{p}, \vec{q})e^{i\vec{p}\cdot(\vec{x}_A-\vec{x}_A^0)}d\vec{x}_A \qquad \text{(Eq. 12)}$$

$$= \sum_L G(\vec{x}_A^0, \vec{x}; \vec{p}, \vec{q})\oiint_{\Delta s_A}\phi(\vec{x}_A)e^{i\vec{p}\cdot(\vec{x}_A-\vec{x}_A^0)}d\vec{x}_A$$

$$= \sum_L G(\vec{x}_A^0, \vec{x}; \vec{p}, \vec{q}) \cdot \Phi(\vec{x}_A^0, \vec{p})$$

$$= \sum_L \phi(\vec{x}, \vec{q})$$

where $$\phi(\vec{x}, \vec{q}) = G(\vec{x}_A^0, \vec{x}; \vec{p}, \vec{q}) \cdot \Phi(\vec{x}_A^0, \vec{p}) \qquad \text{(Eq. 13)}$$

is a poststack image atom. The poststack image atom may be generated from a piece of input data at surface location $\vec{x}_A^0$ with time dip $\vec{p}$, propagated to subsurface location $\vec{x}$, arriving at direction $\vec{q}$. Equation (13) maps a diplet in the unmigrated domain $\Phi(\vec{x}_A^0, \vec{p})$ to another diplet in the poststack-migrated domain $\phi(\vec{x}_B, \vec{q})$. The final poststack depth image is the sum of all migrated diplets as indicated in equation (12).

Prestack Diplet Imaging Algorithm

Figure 7:
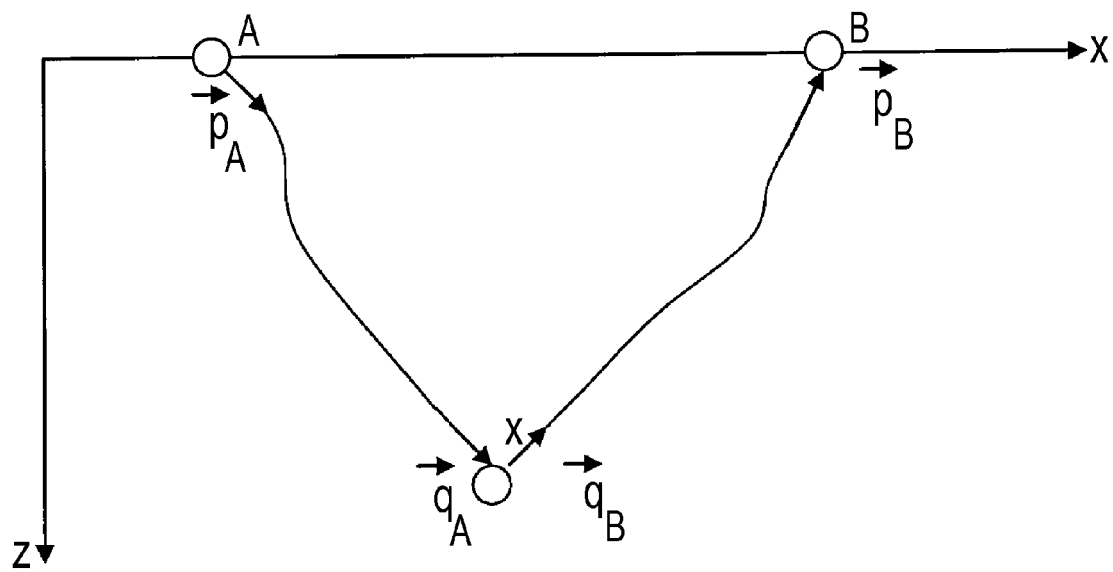

FIG. 7 shows a packet of seismic energy leaving surface location A, the packet of energy travels in the Earth, the reflection of the packet of energy at subsurface location X, and finally the packet of energy reaches surface location B. Let $\vec{x}_A$ be the source location and $\vec{x}_B$ be the receiver position. Let $\vec{p}_A$ be the direction of energy leaving the source location and $\vec{p}_B$ be the direction of energy arriving at the receiver location. Let $\vec{q}_A$ be the direction of energy arriving at a subsurface point $\vec{x}$ from the source location and $\vec{q}_B$ be the direction of energy leaving the subsurface point $\vec{x}$ for the receiver location on the surface.

The extended Rayleigh integral is a double integration over source locations A and receiver locations B, with a convolution of two atomic Green's functions as its kernel:

$$\phi(\vec{x}) = \oiint d\vec{x}_A \oiint d\vec{x}_B \phi(\vec{x}_A, \vec{x}_B) \quad \text{(Eq. 14)}$$

$$G(\vec{x}_A, \vec{x}; \vec{p}_A, \vec{q}_A) G(\vec{x}_B, \vec{x}; \vec{p}_B, \vec{q}_B)$$

$$= \sum_{L_A} G(\vec{x}_A, \vec{x}; \vec{p}_A, \vec{q}_A) \sum_{L_B} G(\vec{x}_B, \vec{x}; \vec{p}_B, \vec{q}_B)$$

$$\oiint_{\Delta s_A} d\vec{x}_A \oiint_{\Delta s_B} d\vec{x}_B \phi(\vec{x}_A, \vec{x}_B)$$

$$e^{i\vec{p}_A \cdot (\vec{x}_A - \vec{x}_A^0) + i\vec{p}_B \cdot (\vec{x}_B - \vec{x}_B^0)}$$

$$= \sum_{L_A} G(\vec{x}_A^0, \vec{x}; \vec{p}_A, \vec{q}_A) \sum_{L_B} G(\vec{x}_B^0, \vec{x}; \vec{p}_B, \vec{q}_B)$$

$$\Phi(\vec{x}_A^0, \vec{x}_B^0; \vec{p}_A, \vec{p}_B)$$

$$= \sum_{L_A} \sum_{L_B} \phi(\vec{x}, \vec{q}_A, \vec{q}_B)$$

where $$\phi(\vec{x}, \vec{q}_A, \vec{q}_B) = \quad \text{(Eq. 15)}$$

$$G(\vec{x}_A^0, \vec{x}; \vec{p}_A, \vec{q}_A) G(\vec{x}_B^0, \vec{x}; \vec{p}_B, \vec{q}_B) \cdot \Phi(\vec{x}_A^0, \vec{x}_B^0; \vec{p}_A, \vec{p}_B)$$

is a prestack image atom. It relates a piece of prestack unmigrated seismic data to a piece of prestack-migrated data. Equation (15) maps a diplet in the unmigrated domain $\Phi(\vec{x}_A^0, \vec{x}_B^0; \vec{p}_A, \vec{p}_B)$ to another diplet in the prestack-migrated domain $\phi(\vec{x}, \vec{q}_A, \vec{q}_B)$. The final prestack depth migration is the summation of all migrated prestack diplets as indicated in equation (14).

The atomic Green's functions in equation (15) are computed using 3D kinematic ray tracing (if amplitude is not required) or 3D dynamic ray tracing (if amplitude is needed).

Diplet Imaging Space

Diplet imaging affords a seven-dimensional space for exploration prior to final stacking. The migrated dip vector is given by:

$$\vec{v} = \frac{1}{2}(\vec{q}_A + \vec{q}_B) \quad \text{(Eq. 16)}$$

And the migrated reflection angle vector is given by:

$$\vec{\vartheta} = \frac{1}{2}(\vec{q}_B - \vec{q}_A) \quad \text{(Eq. 17)}$$

In certain example implementations, the additional four-dimensional space spanned by $(\vec{v}, \vec{\theta})$ is explored for one or more of signal separation, noise attenuation, gather generation, and selective stacking.

Common Offset Diplet Migration

For narrow-azimuth marine data partitioned into constant-offset volumes, the diplet derived from the unmigrated data is only a five-dimensional (x, y, t, inline time dip, crossline time dip) subspace of the seven-dimensional diplets required in equation (15) for migration. The other two dimensions are indirectly related to the acquisition offset and acquisition azimuth by Snell's law. The vector form of Snell's law can be written as:

$$\vec{q}_B = 2(\vec{n} \cdot \vec{q}_A)\vec{n} - \vec{q}_A, \quad \text{(Eq. 18)}$$

where $\vec{n}$ is the local normal of the diplet at the reflection location $\vec{x}$. The following equations are used to compute $\vec{q}_A$, given reflection angle $\theta$ and reflection azimuth $\phi$:

$$\vec{q}_A \cdot \vec{q}_A = 1$$

$$\vec{n} \cdot \vec{q}_A = \cos\theta$$

$$\vec{\sigma} \cdot \vec{n} \times (\vec{n} \times \vec{q}_A) = \sin\theta \cos\phi, \quad \text{(Eq. 19)}$$

where $\vec{\sigma}$ is the projection of vector (1, 0, 0) onto the diplet (reflection) plane. The first equation is normalization, the second equation applies Snell's law in a simple form, and the third equation describes collinearity of vectors $\vec{n}$, $\vec{q}_A$, $\vec{q}_B$.

The normal vector $\vec{n}$ of a diplet is related to its inline dip $\gamma$ and crossline dip $v$ by, $$n_x = \frac{\cos\gamma \sin\alpha}{\sqrt{\cos^2\gamma + \sin^2\gamma \cos^2\alpha}} \quad \text{(Eq. 20)}$$

$$n_y = \frac{\sin\gamma \cos\alpha}{\sqrt{\cos^2\gamma + \sin^2\gamma \cos^2\alpha}}$$

$$n_z = -\frac{\cos\gamma \cos\alpha}{\sqrt{\cos^2\gamma + \sin^2\gamma \cos^2\alpha}}$$

The migrated dip vector is given by equation (16), and the migrated reflection angle vector is given by equation (17).

The migrated position $\vec{x}$ is given indirectly by solving the following nonlinear equations:

$$t(\vec{x}_M^0) = t(\vec{x}_A^0, \vec{x}) + t(\vec{x}_B^0, \vec{x})$$

$$\vec{p}_m(\vec{x}_M^0) = \vec{p}(\vec{x}_A^0, \vec{x}) + \vec{p}(\vec{x}_B^0, \vec{x}) \quad \text{(Eq. 21)}$$

The common-offset migration maps a five-dimensional diplet in the unmigrated domain $(\vec{x}_M^0, t, \vec{p}_M)$ to another 5-dimensional diplet in the migrated domain $(x, y, z, \alpha, \gamma)$. In certain example implementations, no information is lost in the migration process.

The wavelet stretch is related to the dips of the reflector, the reflection angle and velocity. Stretch should be applied to wavelets prior to saving them. The stretch formula is $$\frac{dt}{dz} = \frac{2}{V} \frac{\cos\gamma \cos\alpha}{\sqrt{\cos^2\gamma + \sin^2\gamma \cos^2\alpha}} \cos\vartheta \quad \text{(Eq. 22)}$$

where V is the velocity at the reflection point.

Estimation of Beam Spreading Attribute

Beam spreading will occur as one propagates a diplet into the subsurface for imaging. The amount of spreading can be estimated using, for example, the Gaussian Beam approximation.

In the ray-centered coordinate system, the Gaussian Beam solution to the acoustic wave equation can be written as:

$$u_{GB}(s, n, \omega) = \left(\frac{V(s)}{Q(s)}\right)^{\frac{1}{2}} e^{i\omega\tau(s) + \frac{i\omega P(s)}{2Q(s)}n^2} \quad \text{(Eq. 23)}$$

where variable s is the ray arc length parameter that monotonically increases along a ray path, and variable n is the perpendicular distance to the center ray in the ray-centered coordinate system. $\omega$ is the source frequency and V(s) is the velocity on the center ray at s.

P(s) and Q(s) may be obtained by solving the dynamic ray tracing equations:

$$\frac{dQ(s)}{d\tau} = V^2(s) P(s) \quad \text{(Eq. 24)}$$

$$\frac{dP(s)}{d\tau} = -\frac{1}{V(s)} \frac{\partial^2 V(s, n)}{\partial n^2} Q(s)$$

where variable $\tau$ is the travel time along the center ray.

Ross Hill (1990) and Cerveny (1982) give the following initial values for the above ODE:

$$P_0 = \frac{i}{V_0} \quad \text{(Eq. 25)}$$

$$Q_0 = \frac{\omega_r L_0^2}{V_0}$$

where $L_0$ is the initial beam width, $\omega_r$ is a reference frequency, and $V_0$ is the velocity at a starting point on the surface.

The spreading of a beam is $$\frac{1}{\text{Spread}} \propto \sqrt{\omega \text{Im}\left(\frac{P(s)}{Q(s)}\right)} \quad \text{(Eq. 26)}$$

which varies as a function ray propagation distance s.

For the constant velocity case, $$P = P_0 = \frac{i}{V_0} \quad \text{(Eq. 27)}$$

$$Q = Q_0 + t V_0^2 P_0 = \frac{\omega_r L_0^2}{V_0} + it V_0$$

In that case, the spreading is given as $$\text{Spread} \propto \sqrt{\left(\frac{\omega_r}{\omega}\right) L_0^2 + \frac{t^2 V_0^4}{\omega \omega_r L_0^2}} \quad \text{(Eq. 28)}$$

It is interesting to note that when the travel time t is small, the second term inside the square root is small and the spread is basically the initial beam width. When the travel time is large, however, the spread is proportional to the travel time. The beam starts out like a plane wave and eventually spreads out like a point source.

Example Migration Results

To demonstrate, we start with a stacked, unmigrated 3D volume from a marine seismic survey. The volume covers 9 OCS blocks and its decomposition yields almost ½ million diplets. This is a representative fragment of the associated vertex file, showing the header and the first few diplets:

```
XXXXX VSet 1
HEADER {
dipletCB_name:xxxxx_unmigrated
extent:410.096985 393.701019
taper:Hanning
wavelet_length:21
sample_rate:4.000000
ndiplet:529285
data_origin:Voxet
domain_type:Time
data_type:Unmigrated
voxet_name:/data4/test/jsheng/dump/xxxxx_UNMIGRATED/xxxxx_unmigrated_stacked_small.vo
volume_name:xxxxx_unmigrated_stack_2005_volumes_0
survey3d:/data1/ex1/xxxxx_survey.xml
wavelet_filename:/data4/test/unmigrated_stack_2005_volumes_0_offset0_azimuth65.wavelet
}
XXXXX_ORIGINAL_COORDINATE_SYSTEM
NAME local
AXIS_NAME "X" "Y" "Z"
AXIS_UNIT "ft" "ft" "ft"
ZPOSITIVE Depth
END_ORIGINAL_COORDINATE_SYSTEM
PROPERTIES xdip ydip offset azimuth theta psai flag amplitude coherency wavelet_bank_ID sp1 sp2 sp3
SUBVSET
PVRTX 1 2600161.25 9899108.0 10327.354492 0.100605 0.261371 0.0 -65.412735 -999.000000 -999.000000 1 4.456591 0.568804 0
PVRTX 2 2600161.25 9899108.0 8432.172852 0.092154 0.251071 0.0 -65.412735 -999.000000 -999.000000 1 7.505949 0.685081 1
PVRTX 3 2600161.25 9899108.0 3517.562256 -0.154631 0.133992 0.0 -65.412735 -999.000000 -999.000000 1 9.893762 0.608567 2
PVRTX 4 2600161.25 9899108.0 3685.187012 -0.189920 0.108977 0.0 -65.412735 -999.000000 -999.000000 1 6.243549 0.506171 3
PVRTX 5 2600161.25 9899108.0 3324.360107 -0.041312 0.173549 0.0 -65.412735 -999.000000 -999.000000 1 5.573402 0.572643 4
PVRTX 6 2600161.25 9899108.0 11715.454102 -0.162965 0.115339 0.0 -65.412735 -999.000000 -999.000000 1 4.012047 0.515581 5
PVRTX 7 2600161.25 9899108.0 9139.870117 0.099384 0.230937 0.0 -65.412735 -999.000000 -999.000000 1 7.540207 0.561510 6
PVRTX 8 2600161.25 9899108.0 10985.378906 -0.207908 0.088299 0.0 -65.412735 -999.000000 -999.000000 1 6.593009 0.554969 7
PVRTX 9 2600161.25 9899108.0 3686.929443 -0.199379 0.091726 0.0 -65.412735 -999.000000 -999.000000 1 6.267160 0.540037 8
PVRTX 10 2600161.25 9899108.0 2520.461914 -0.224133 0.079596 0.0 -65.412735 -999.000000 -999.000000 1 6.682146 0.607898 9
```

Each line that starts with PVRTX defines a diplet. In those lines, the second column is the diplet index number, followed by x, y, t, dt/dx, dt/dy, offset, azimuth, reflection angle, reflection azimuth, flag, amplitude, coherency and wavelet BD. Before migration, the reflection angle and reflection azimuth columns are not correctly set.

After migration, the file containing the migrated diplets has a similar structure:

```
XXXXX VSet 1
HEADER {
dipletCB_name:xxxxx_poststack_migrated
extent:410.096985 393.701019
taper:Hanning
wavelet_length:21
sample_rate:32.000000
ndiplet:529285
data_origin:Voxet
domain_type:Depth
data_type:DepthMigrated
voxet_name:/data4/test/jsheng/dump/xxxxx_UNMIGRATED/xxxxx_unmigrated_stacked_small.vo
volume_name:xxxxx_unmigrated_stack_2005_volumes_0
survey3d:/data1/ex1/xxxxx_survey.xml
wavelet_filename:/data4/test/cpeng/xxxxx_poststack_mig_smI1_2x.wbank
}
XXXXX_ORIGINAL_COORDINATE_SYSTEM
NAME local
AXIS_NAME "X" "Y" "Z"
AXIS_UNIT "ft" "ft" "ft"
ZPOSITIVE Depth
END_ORIGINAL_COORDINATE_SYSTEM
PROPERTIES xdip ydip offset azimuth theta psai flag amplitude coherency wavelet_bank_ID spread
SUBVSET
PVRTX 1 2600161.2 9899108.0 10327.354492 0.100605 0.261371 0.0 -65.41 -999.0 -999.000000 0 4.456591 0.568804 0 1.000000
PVRTX 2 2595739.3 9882606.1 2409.917480 -0.275343 -1.401225 0.0 -65.41 0.0 -65.412735 1 7.505949 0.685081 1 1.565607
PVRTX 3 2603811.8 9895802.0 7438.548828 -1.003312 1.095655 0.0 -65.41 0.0 -65.412735 1 9.893762 0.608567 2 0.646038
PVRTX 4 2604884.0 9895979.5 7547.256348 -1.247893 1.317817 0.0 -65.41 0.0 -65.412735 1 6.243549 0.506171 3 0.687041
PVRTX 5 2601040.4 9895118.4 7420.305664 -0.160619 1.087149 0.0 -65.41 0.0 -65.412735 1 5.573402 0.572643 4 0.611920
PVRTX 6 2619922.2 9879864.3 1615.401978 0.667500 -0.709778 0.0 -65.41 0.0 -65.412735 1 4.012047 0.515581 5 2.501016
PVRTX 7 2594735.1 9879551.6 3383.357422 -0.197223 -1.090903 0.0 -65.41 0.0 -65.412735 1 7.540207 0.561510 6 1.840228
PVRTX 8 2620544.3 9880342.9 4036.098389 0.597325 -0.626452 0.0 -65.41 0.0 -65.412735 1 6.593009 0.554969 7 2.477942
PVRTX 9 2605180.6 9896271.9 7564.459961 -1.303030 1.252086 0.0 -65.41 0.0 -65.412735 1 6.267160 0.540037 8 0.693678
```

In the file above, the two-way time column is replaced by depth, dt/dx is replaced by dz/dx, and dt/dy is replaced by dz/dy. Regarding measurement units in the above example, the output depth is in feet and the migrated dips are in degrees. The reflection angle and reflection azimuth are also in degrees. The derivation of reflection azimuth from acquisition azimuth is an indication of ray path rotation, and is directly related to complexity of the subsurface velocity model.

Figure 8:
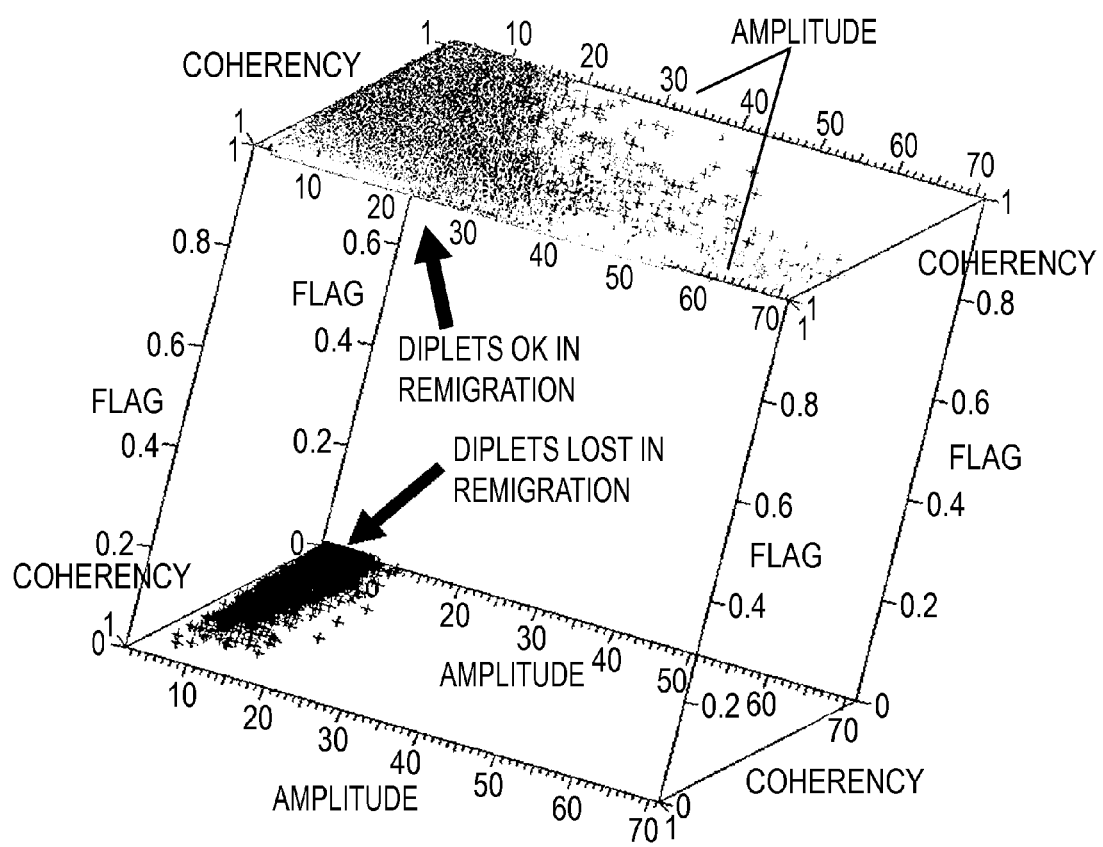
FIG. 8 is three-dimensional cross-plot of a collection of diplets in its attribute space, showing separation of successful diplets and lost diplets in migration.

During migration, demigration or remigration, rays may fail, causing diplets to be lost; in that case, they receive a flag value of 0 instead of 1. For the migration results above, FIG. 8 crossplots the amplitude, coherency, and flag attributes for all the diplets processed. The color code represents beam spreading during migration. All lost diplets are low in amplitude, somewhat low in coherency and suffer significant spreading during migration.

In some example implementations, additional processing is performed on the migrated diplets prior to final synthesis into seismic volumes. The additional processing may include one or more of the removal of diplets deemed to be noise or otherwise not desired, the application of amplitude scaling or wavelet filtering to subsets of diplets, binning and sorting diplets into subsets for generating different gather types, and subsetting diplets according to any combination of attributes.

Demigration of Seismic Data Using Diplets

Diplet Demigration Implementation

From equation (15), the prestack diplet demigration formula is $$\Phi(\vec{x}_A^0, \vec{x}_B^0; \vec{p}_A, \vec{p}_B) = G^*(\vec{x}_A^0, \vec{x}; \vec{p}_A, \vec{q}_A) G^*(\vec{x}_B^0, \vec{x}; \vec{p}_B, \vec{q}_B) \cdot \phi(\vec{x}, \vec{q}_A, \vec{q}_B), \quad \text{(Eq. 29)}$$

where $\phi(\vec{x}, \vec{q}_A, \vec{q}_B)$ are the input migrated diplets (in seven-dimensional space) and $\Phi(\vec{x}_A^0, \vec{x}_B^0, \vec{p}_A, \vec{p}_B)$ are the output denigrated diplets.

Common Offset Diplet Demigration

For narrow-azimuth marine data migrated with a common-offset prestack depth imaging algorithm, the diplet derived from the migrated data will be only 5 dimensional (x, y, z, inline_dip, crossline_dip). In that case, the 7-dimensional diplets required for demigration (equation 28) will not be immediately available. However, the two other dimensions are indirectly related to the acquisition offset and acquisition azimuth by Snell's law.

In one example implementation, the atomic Green's functions in equation (29) are computed using three-dimensional kinematic ray tracing (if amplitude is not required) or 3D dynamic ray tracing (if amplitude is needed).

The demigrated middle point position is given by $$\vec{x}_M^0 = \frac{1}{2}(\vec{x}_A^0 + \vec{x}_B^0) \quad \text{(Eq. 30)}$$

The demigrated time-dip vector is given by $$\vec{p}_M = \vec{p}_A + \vec{p}_B \quad \text{(Eq. 31)}$$

The demigrated time is given by $$t(\vec{x}_M^0) = t(\vec{x}_A^0, \vec{x}) + t(\vec{x}_B^0, \vec{x}) \quad \text{(Eq. 32)}$$

The common-offset demigration maps a five-dimensional diplet in the migrated domain (x, y, z, α, γ) to another five-dimensional diplet in the unmigrated domain ($\vec{x}_M^0$, $\vec{p}_M$, t). No information is lost in the demigration process.

The wavelet stretch is related to the reflector dip, reflection angle and velocity, and needs to be applied to unstretch each wavelet prior to saving it. The stretch formula is provided above in equation (22).

Example Demigration Results

To demonstrate, we use a 3D image of a single offset (nonzero) from a marine seismic survey. The image covers 9 OCS blocks and its decomposition yields almost ½ million diplets. This is a representative fragment of the associated vertex file, showing the header and the first few diplets:

```
XXXXX VSet 1
HEADER {
dipletCB_name:xxxxxx_lsq
extent:574.136597 656.168457
taper:2
wavelet_length:21
sample_rate:32.000000
ndiplet:467723
domain_type:0
data_type:0
data_origin:1
voxet_name:/data1/ex1/xxxxxx_hcb_16/volumes/xxxxxx_vts_2005_volumes.vo
volume_name:xxxxxx_vts_2005_volumes_0
survey3d:/data1/ex1/xxxxxx_survey.xml
wavelet_filename:/data4/test/jsheng/Xxxxxx/xxxxxx_vol0_iter1.bin
}
PVRTX 1 2610494.739255 9914720.061094 4256.000000 −0.039069 −0.023315 1350.000000 −64.999619 0.000000 −64.999619 1 3874.282227 0.801782 0
PVRTX 2 2610494.739255 9914720.061094 4352.000000 −0.057829 0.003849 1350.000000 −64.999619 0.000000 −64.999619 1 8694.213867 0.788522 1
PVRTX 3 2610494.739255 9914720.061094 4448.000000 −0.041964 −0.030132 1350.000000 −64.999619 0.000000 −64.999619 1 25974.392578 0.887021 2
PVRTX 4 2610494.739255 9914720.061094 4448.000000 0.124754 0.980151 1350.000000 −64.999619 0.000000 −64.999619 1 6282.579590 0.620662 3
PVRTX 5 2610494.739255 9914720.061094 4544.000000 −0.018916 −0.014124 1350.000000 −64.999619 0.000000 −64.999619 1 8412.059570 0.770860 4
PVRTX 6 2610494.739255 9914720.061094 4640.000000 −0.036456 −0.030367 1350.000000 −64.999619 0.000000 −64.999619 1 7036.276367 0.750457 5
PVRTX 7 2610494.739255 9914720.061094 4704.000000 −0.036751 −0.030502 1350.000000 −64.999619 0.000000 −64.999619 1 6728.099609 0.689374 6
PVRTX 8 2610494.739255 9914720.061094 5120.000000 0.190419 0.070367 1350.000000 −64.999619 0.000000 −64.999619 1 9826.871094 0.678757 7
PVRTX 9 2610494.739255 9914720.061094 5248.000000 0.254199 0.091214 1350.000000 −64.999619 0.000000 −64.999619 1 4327.437988 0.670103 8
PVRTX 10 2610494.739255 9914720.061094 5856.000000 0.176048 0.138002 1350.000000 −64.999619 0.000000 −64.999619 1 11032.748047 0.669032 9
PVRTX 11 2610494.739255 9914720.061094 6016.000000 0.149815 0.134279 1350.000000 −64.999619 0.000000 −64.999619 1 5900.124023 0.638750 10
PVRTX 12 2610494.739255 9914720.061094 7232.000000 0.190260 0.199439 1350.000000 −64.999619 0.000000 −64.999619 1 8994.974609 0.621334 11
PVRTX 13 2610494.739255 9914720.061094 7392.000000 0.221476 0.133992 1350.000000 −64.999619 0.000000 −64.999619 1 7786.700195 0.681825 12
PVRTX 14 2610494.739255 9914720.061094 7520.000000 0.247610 0.143164 1350.000000 −64.999619 0.000000 −64.999619 1 9516.060547 0.647934 13
PVRTX 15 2610494.739255 9914720.061094 8160.000000 0.280154 0.377829 1350.000000 −64.999619 0.000000 −64.999619 1 11314.603516 0.600184 14
PVRTX 16 2610494.739255 9914720.061094 8192.000000 0.427604 0.291209 1350.000000 −64.999619 0.000000 −64.999619 1 9831.940430 0.639378 15
PVRTX 17 2610494.739255 9914720.061094 8416.000000 0.511784 0.293884 1350.000000 −64.999619 0.000000 −64.999619 1 11394.879883 0.660661 16
```

Each line that starts with PVRTX defines a diplet. In those lines, the 2$^{nd}$ column is the diplet index number, followed by x, y, z, dz/dx, dz/dy, offset, azimuth, reflection angle, reflection azimuth, flag, amplitude, coherency and wavelet ID.

Before demigration, the reflection angle and reflection azimuth columns are not correctly set.

After demigration, the file containing the demigrated diplets has a similar structure:

```
XXXXX VSet 1
HEADER {
dipletCB_name:xxxxxx_test1
extent:574.136597 656.168457
taper:2
wavelet_length:21
sample_rate:0.004000
ndiplet:467723
domain_type:1
data_type:1
data_origin:1
voxet_name:/data1/ex1/xxxxxx_hcb_16/volumes/xxxxxx_vts_2005_volumes.vo
volume_name:xxxxxx_vts_2005_volumes_0
survey3d:/data1/ex1/xxxxxx_survey.xml
wavelet_filename:/data4/test/cpeng/xxxxxx_test1_demig.wbank
}
PVRTX 1 2610327.484620 9914620.616137 1.753019 −0.015649 −0.009356 1349.208862 −65.057144 9.024042 −65.022430 1 0.000000 0.000000 0
PVRTX 2 2610242.531036 9914737.230072 1.792564 −0.023088 0.001433 1349.525513 −64.955574 8.870172 −65.112793 1 0.000000 0.000000 1
PVRTX 3 2610310.292249 9914585.659137 1.830123 −0.016737 −0.012117 1348.941162 −65.046776 8.758749 −64.972237 1 0.000000 0.000000 2
PVRTX 4 2611011.504387 9918977.099384 2.519969 0.035134 0.277403 1350.019165 −65.094040 5.193528 −48.576126 1 0.000000 0.000000 3
PVRTX 5 2610328.318008 9914577.330091 1.904631 −0.014504 −0.012303 1350.905640 −65.027687 8.644144 −64.925514 1 0.000000 0.000000 5
PVRTX 6 2610323.555880 9914572.406863 1.929131 −0.014596 −0.012396 1351.561279 −65.031059 8.655914 −64.968887 1 0.000000 0.000000 6
PVRTX 7 2611309.807212 9915005.613145 2.105499 0.062351 0.021746 1350.305420 −64.980743 8.589396 −65.143814 1 0.000000 0.000000 7
PVRTX 8 2611579.805952 9915091.678513 2.169234 0.080070 0.027333 1350.544678 −65.015305 8.512696 −65.221931 1 0.000000 0.000000 8
PVRTX 9 2611266.822325 9915324.441851 2.343026 0.050093 0.038857 1349.907227 −64.999168 8.314863 −64.590607 1 0.000000 0.000000 9
PVRTX 10 2611165.145547 9915325.935343 2.385147 0.042016 0.037619 1351.391235 −64.981644 8.180653 −64.567055 1 0.000000 0.000000 10
PVRTX 11 2611487.869747 9915781.945561 2.748435 0.048216 0.051511 1350.594116 −64.982841 7.285191 −64.294998 1 0.000000 0.000000 11
PVRTX 12 2611666.914613 9915460.821239 2.783264 0.055358 0.034961 1350.616089 −64.970917 7.260965 −64.962471 1 0.000000 0.000000 12
PVRTX 13 2611810.336431 9915510.325632 2.824377 0.060437 0.036417 1348.492920 −64.943893 7.158324 −64.939384 1 0.000000 0.000000 13
PVRTX 14 2612052.301965 9916809.976847 3.064672 0.063287 0.085030 1350.845093 −65.017235 6.631177 −62.093655 1 0.000000 0.000000 14
PVRTX 15 2612837.105554 9916384.170378 3.100836 0.094942 0.067169 1350.493164 −64.961090 7.038949 −64.278519 1 0.000000 0.000000 15
PVRTX 16 2613122.918118 9916602.790838 3.179015 0.101599 0.072438 1351.728149 −64.976799 9.523520 −65.324326 1 0.000000 0.000000 16
PVRTX 17 2612077.305087 9916266.068131 3.099061 0.060938 0.060021 1349.958008 −64.999016 10.388293 −61.127392 1 0.000000 0.000000 17
```

In the above file, the depth column is replaced by two-way travel time, dz/dx is replaced by dt/dx, and dz/dy is replaced by dt/dy.

Regarding measurement units, the output two-way travel time is in seconds, the time dips are in ms/ft or ms/m, depending on the measurement system used. The reflection angle and reflection azimuth are in degrees. The derivation of reflection azimuth from acquisition azimuth is an indication of ray path rotation, and is directly related to the complexity of the subsurface velocity model.

Using Diplets to Convert Between Offset and Angle Gathers

In one example implementation, diplets are used to covert between one offset or angle gather to a second offset or angle gather.

Residual Prestack Depth Migration

Cascading equation (15) and equation (29):

$$\phi(\vec{x}, \vec{q}_A, \vec{q}_B; V_{new}) = G(\vec{x}_A^0, \vec{x}; \vec{p}_A, \vec{q}_A; V_{new}) G(\vec{x}_B^0, \vec{x}, \vec{p}_B, \vec{q}_B; V_{new}) G^*(\vec{x}_A^0, \vec{x}'; \vec{p}'_A, \vec{q}'_A; V_{old}) G^*(\vec{x}_B^0, \vec{x}'; \vec{p}'_B, \vec{q}'_B; V_{old}) \cdot \phi(\vec{x}', \vec{q}'_A, \vec{q}'_B; V_{old})$$ (Eq. 33)

This relates a migrated diplet in one velocity model to its corresponding migrated diplet in another velocity model, for a given input unmigrated diplet at the surface. When the migration velocity model changes, subsurface position and orientation will change, but the travel time, time dips, and acquisition configuration of the input unmigrated diplet will not change.

Generalized Gather Conversion Implementation

Equation (33) can be exploited for converting offset gathers to angle gathers (and vice versa) regardless of whether the two velocity models are the same. In general, it requires computation of four atomic Green's functions (only two if the velocity models are the same). During the Green's function computation, all attributes in the output diplet are calculated, including acquisition offset and acquisition azimuth (if reflection-angle gathers are input) and reflection angle and reflection azimuth (if offset gathers are input).

Figure 9:
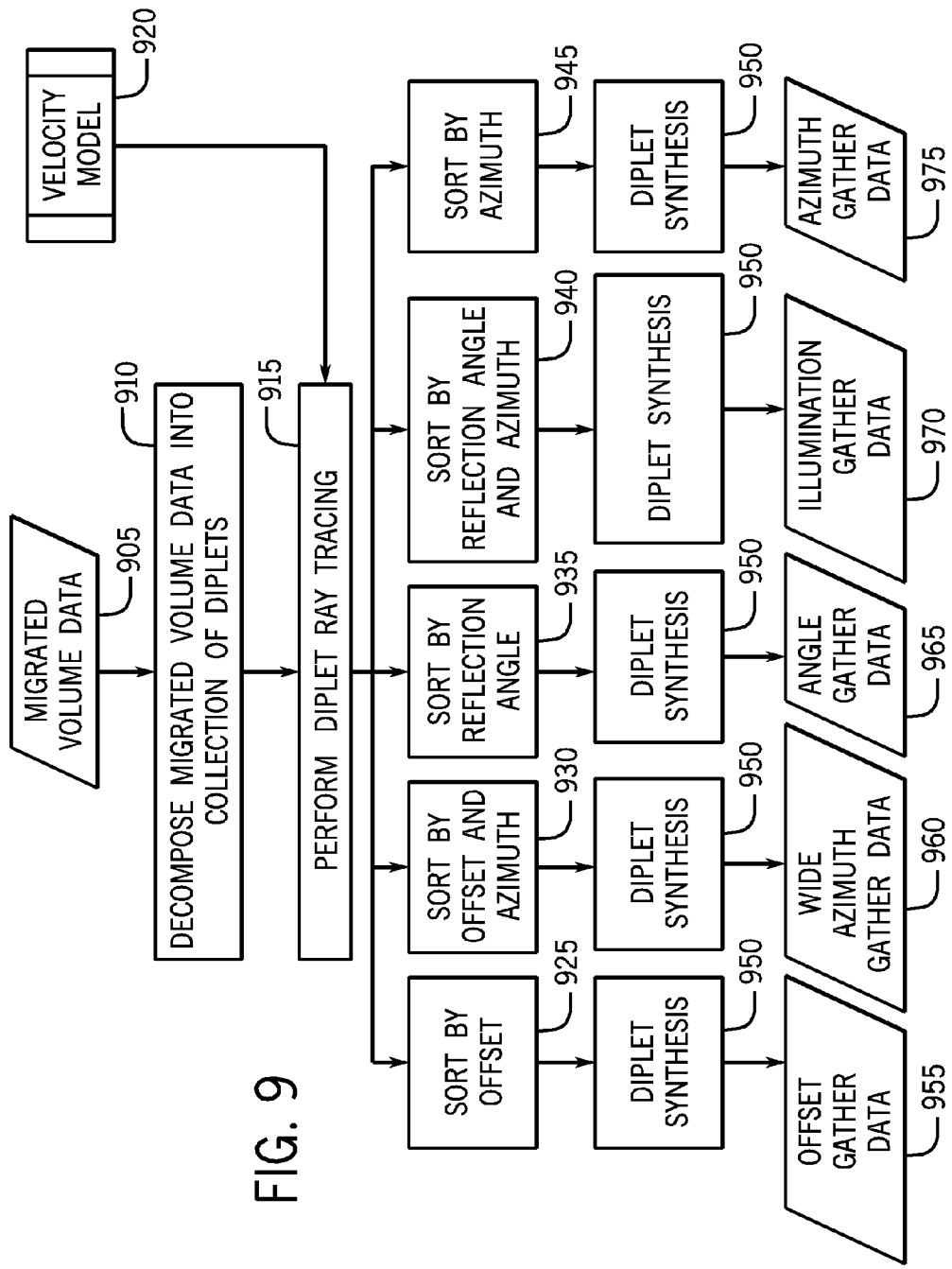
FIG. 9 is a flow chart illustrating an example method of converting between seismic gathers.

FIG. 9 is a flow chart illustrating an example method for converting between gather. Migrated volume data is input in block 905. The method includes decomposing the migrated volume data into a collection of diplets (block 910). The method further includes performing diplet ray tracing in block 915, based on a velocity model 920 to determine an acquisition offset, a reflection angle, and reflection azimuth for one or more of the diplets. The method then includes one or more binning and sorting steps (block 925-945) followed by diplet synthesis (block 950) to generate new gather data (block 955-976). For example, the method may include sorting the decomposed diplets by offset (block 925) to generate offset gather data (block 955). In another example, the method includes sorting the decomposed diplets by offset and azimuth (block 930) to generate wide azimuth gather data (block 960). In another example, the method includes sorting the decomposed diplets by reflection angle (block 935) to generate angle gather data (block 965). In another example, the method includes sorting the decomposed diplets by reflection angle and azimuth (block 940) to generate illumination gather data (block 970). In another example, the method includes sorting the decomposed diplets by azimuth (block 945) to generate azimuth gather data (block 975).

In one example implementation, the step of performing the diplet ray tracing (block 915) is performed by computing the atomic Green's function of each diplet to supply the following attributes of the diplet: offset, acquisition azimuth, reflection angle, and reflection azimuth. If, however, the velocity model 920 is unchanged from the migrated volume data, then only two atomic Green's functions need to be calculated. In this case all other attributes of the diplet rather than those explicitly listed above are unchanged.

Further diplet processing may be performed to remove or attenuate noise and to perform signal enhancement.

Synthetic-Data Example

Figure 10A:
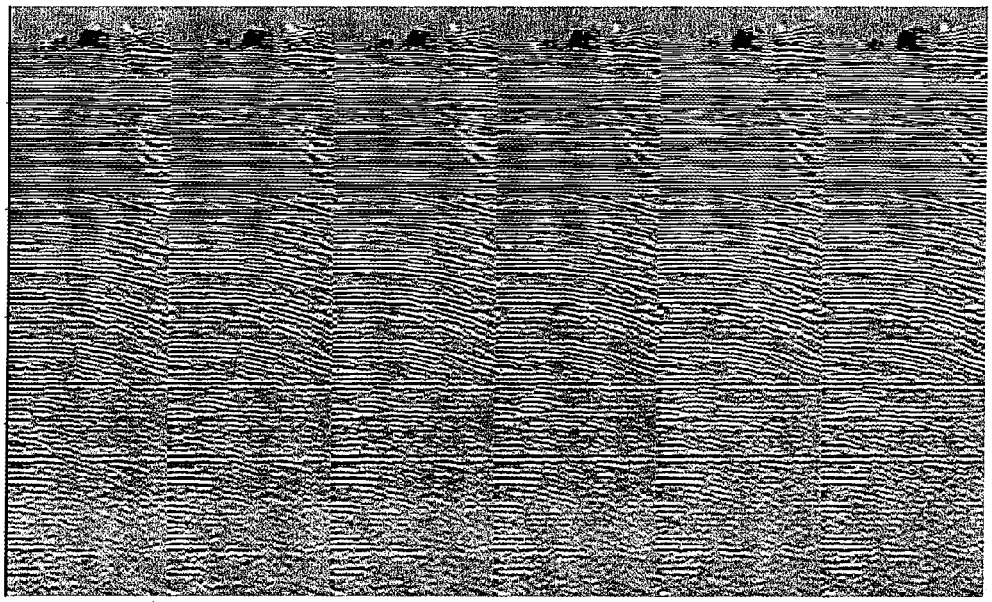
FIGS. 10A and 10B are examples of seismic offset image gathers and angle image gathers.
Figure 10B:
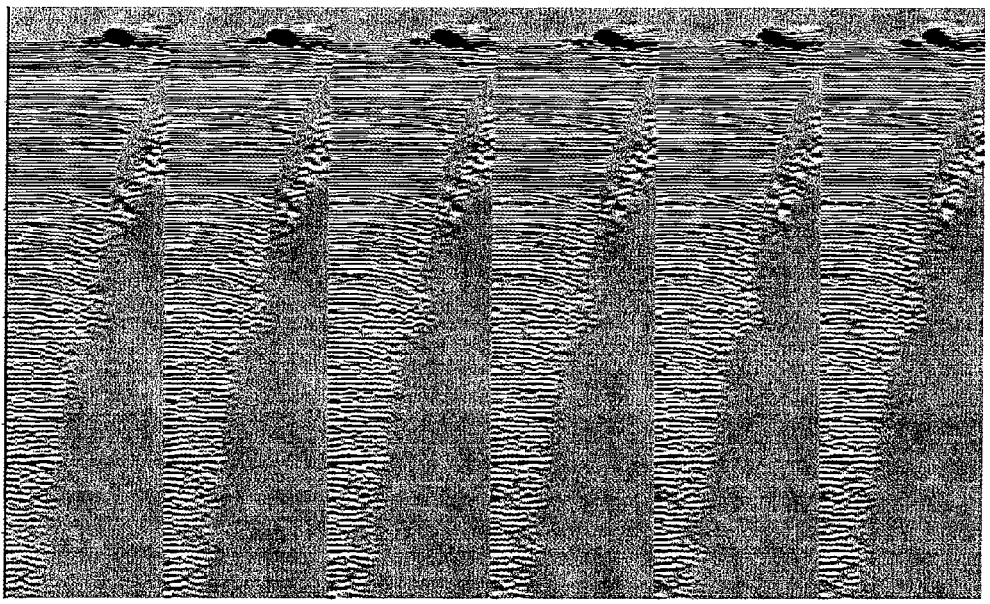

FIG. 10A shows migrated offset gathers at x=24612.5 m location in the synthetic data set. FIG. 10B shows converted angle gathers at the same location. A common-offset 3D diplet migration is applied to a synthetic data set. For the migration, we used the same velocity model that was used to generate the synthetic data. Accordingly, events are flat in offset gathers after migration, as shown in FIG. 10A. FIG. 10B shows the result of our diplet-based conversion from offset to reflection angle gathers, which illustrates the decrease in angular coverage as depth increases.

The methods of the present disclosure described above may be implemented in software to run on one or more computers, where each computer includes one or more processors, a memory, and may include further data storage, one or more input devices, one or more output devices, and one or more networking devices.

The above method may be used to determine where to perform subterranean activities, such as drilling or fracturing The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A method comprising:
   processing data indicative of a first seismic volume in a machine to decompose at least part of the first seismic volume into a collection of diplets such that a superposition of the diplets forms a complete representation of the at least part of the first seismic volume, wherein at least one of the diplets comprises a superposition of individual dip components indicative of a dip interface;
   migrating the collection of diplets using a velocity model; and
   generating at least part of a seismic volume based at least in part on the migrating.

2. The method of claim 1, wherein the at least one diplet further comprises information about one or more derived attributes selected from the group consisting of subsurface reflection angle, reflection azimuth, wavelet stretch, beam spreading and each diplet comprises information about spatial location, orientation, amplitude, wavelet, acquisition configuration, and coherency.

3. The method of claim 1, where the first volume comprises one or more of a time migrated volume or a depth migrated volume, the method further comprising:
   demigrating the collection of diplets using a first velocity model that was used to generate the migrated volume; and
   replacing the first velocity with a second velocity model.

4. The method of claim 1, where migrating the collection of diplets using a velocity model comprises:

mapping one or more diplets in the unmigrated domain to one or more corresponding diplets in the migrated domain using one or more velocity models.

5. The method of claim 1, further comprising:
binning and sorting one or more of the migrated diplets to produce a gather output or a subset of a gather output including a single volume output.

6. The method of claim 5, where binning and sorting all or a subset of the migrated diplets to produce a gather output comprises:
binning and sorting by one or more of: acquisition offset; reflection angle; acquisition offset and acquisition azimuth; and reflection angle and reflection azimuth.

7. The method of claim 1, wherein the method is performed by a computer comprising at least one processor and a memory.

8. A method comprising:
processing seismic data on a processor-based machine to represent at least part of a first seismic volume as a set of diplets such that a superposition of the diplets represents the at least part of the first seismic volume, wherein at least one of the diplets comprises a superposition of individual dip components indicative of a dip interface; and
storing the set of diplets.

9. The method of claim 8, wherein the storing comprises storing the set of diplets in a memory.

10. The method of claim 8, wherein the at least one of the diplets further comprises one or more derived attributes.

11. The method of claim 10, wherein the one or more derived attributes comprise one or more of a subsurface reflection angle, a reflection azimuth, a wavelet stretch, and beam spreading.

12. The method of claim 8, wherein the at least one of the diplets comprises information about spatial location, orientation, amplitude, wavelet, acquisition configuration, and coherency.

13. An article comprising a non-transitory tangible storage medium storing program instructions when executed by a computer cause the computer to:
decompose at least part of a first seismic volume into a collection of diplets such that a superposition of the diplets represents the at least part of the first seismic volume, wherein at least one of the diplets comprises a superposition of individual dip components indicative of a dip interface;
migrate the collection of diplets using a velocity model; and
generate at least part of a second seismic volume based at least in part on the migration of the collection of diplets.

14. The article of claim 13, wherein the at least one of the diplets comprises information about spatial location, orientation, amplitude, wavelet, acquisition configuration, and coherency.

15. The article of claim 14, wherein the at least one of the diplets further comprises information about one or more derived attributes selected from the group consisting of subsurface reflection angle, reflection azimuth, wavelet stretch, and beam spreading.

16. The article of claim 13, where the first seismic volume comprises one or more of a time migrated volume or a depth migrated volume, the storage medium storing instructions that when executed by the computer cause the computer to:
demigrate the collection of diplets using a first velocity model that was used to generate the migrated volume; and
replace the first velocity with a second velocity model.

17. The article of claim 13, the storage medium storing instructions that when executed by the computer cause the computer to:
map one or more diplets in the unmigrated domain to one or more corresponding diplets in the migrated domain using one or more velocity models.

18. The article of claim 13, the storage medium storing instructions that when executed by the computer cause the computer to:
bin and sort one or more of the migrated diplets to produce a gather output or a subset of a gather output including a single volume output.

19. The article of claim 13, the storage medium storing instructions that when executed by the computer cause the computer to:
store the collection of diplets in a memory.

20. The article of claim 19, the storage medium storing instructions that when executed by the computer cause the computer to:
bin and sort by one or more of: acquisition offset; reflection angle; acquisition offset and acquisition azimuth; and reflection angle and reflection azimuth.

21. The article of claim 13, wherein the at least one of the diplets further comprises one or more derived attributes comprising one or more of a subsurface reflection angle, a reflection azimuth, a wavelet stretch, and beam spreading.

* * * * *